April 28, 1959 W. E. REASER ET AL 2,883,800

GRINDING WHEEL MOUNTING MECHANISM FOR AN EDGE GRINDING MACHINE

Filed Nov. 7, 1957 4 Sheets-Sheet 1

INVENTOR.
WARREN E. REASER
RALPH TEMPLE
BY Owen + Owen
ATTORNEYS

GRINDING WHEEL MOUNTING MECHANISM FOR AN EDGE GRINDING MACHINE

Filed Nov. 7, 1957 4 Sheets-Sheet 2

INVENTOR.
WARREN E. REASER
RALPH TEMPLE
BY Owen & Owen
ATTORNEYS

GRINDING WHEEL MOUNTING MECHANISM FOR AN EDGE GRINDING MACHINE

Filed Nov. 7, 1957

INVENTOR.
WARREN E. REASER
RALPH TEMPLE
Owen + Owen
ATTORNEYS

April 28, 1959 W. E. REASER ET AL 2,883,800

GRINDING WHEEL MOUNTING MECHANISM FOR AN EDGE GRINDING MACHINE

Filed Nov. 7, 1957 4 Sheets-Sheet 4

INVENTOR.
WARREN E. REASER
BY RALPH TEMPLE
Owen & Owen
ATTORNEYS

United States Patent Office 2,883,800

Patented Apr. 28, 1959

2,883,800

GRINDING WHEEL MOUNTING MECHANISM FOR AN EDGE GRINDING MACHINE

Warren E. Reaser and Ralph Temple, Toledo, Ohio, assignors to The Sun Tool & Machine Company, Toledo, Ohio, a corporation of Ohio Application November 7, 1957, Serial No. 695,042

4 Claims. (Cl. 51—101)

This invention relates to edge grinding machines particularly designed for grinding the edges of small, flat work pieces such as panes of glass for automobile rear vision mirrors, small windows, etc., and more particularly to a mechanism usable in such machine for mounting and controlling the movement of the grinding wheels which finish the edges of such work pieces.

This invention constitutes an improvement on portions of the mechanism disclosed and claimed in Reaser, et al. U.S. Patent No. 2,597,180 and in Reaser co-pending application Serial No. 626,681, filed December 6, 1956.

In the machines shown in the aforementioned patent and application, each of the edge grinding wheels is mounted on a vertical spindle co-axially with a circular template contacting member and the template contacting member, grinding wheel and its spindle and drive motor are all supported upon a frame that swings on an axis parallel to the axis of the spindle. In these machines the entire frame with the grinding wheel and template contactor is swung into and out of operative position to permit the operator to place a work piece to be ground in the machine and to remove a finished work piece from the machine.

It is the principal object of the present invention to provide a machine which will automatically move the grinding wheel into and out of contact with the edges of a work piece wherein the mass of machinery which must be moved is substantially reduced and thus its inertia is greatly lowered in order to prevent damage to the edge of the work piece and to speed up the cycle of operations.

This principal object and other objects will be better understood from the specification which follows, and from the drawings, in which.

Figure 1:
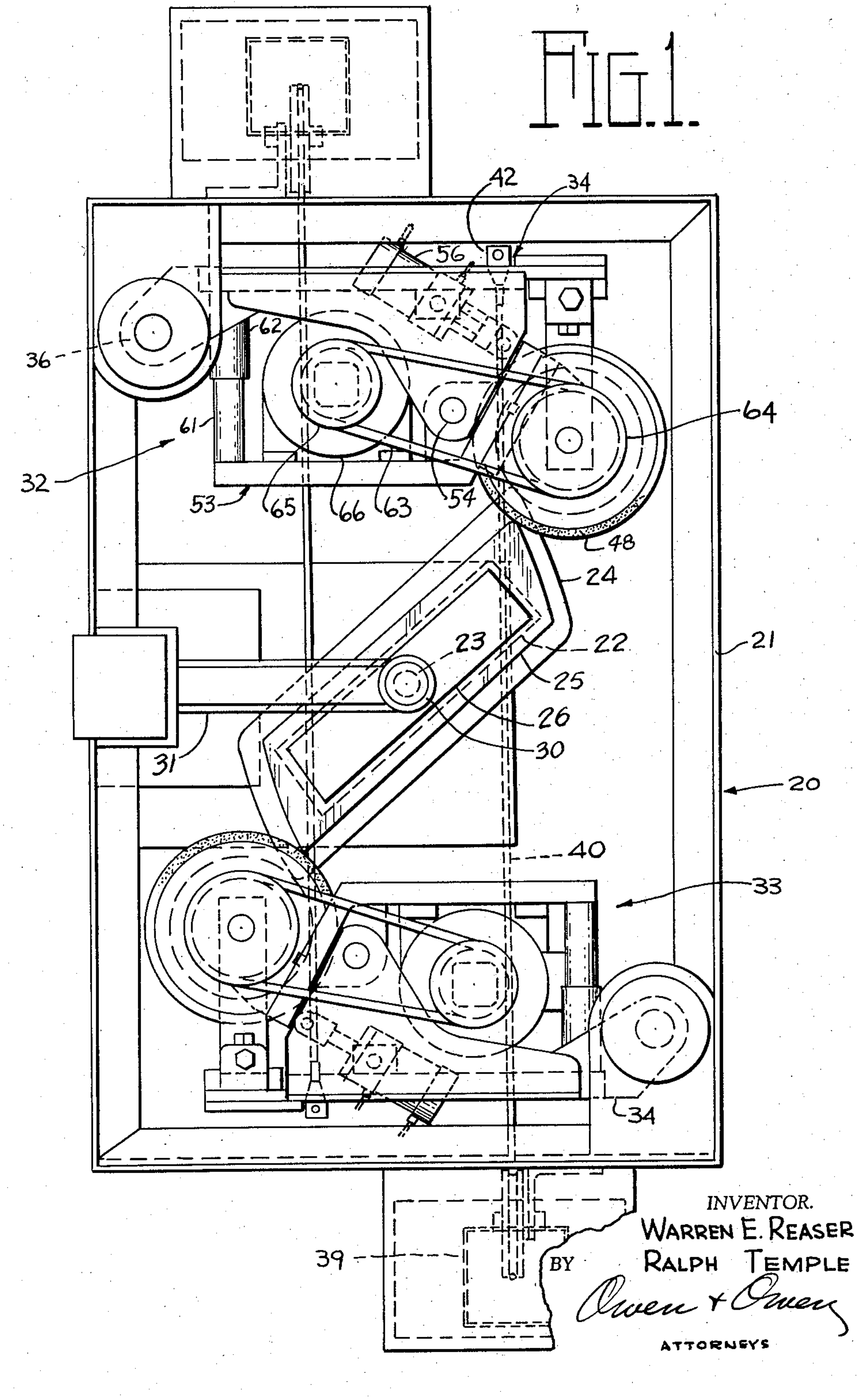
Fig. 1 is a plan view of a machine embodying the invention.
Figure 2:
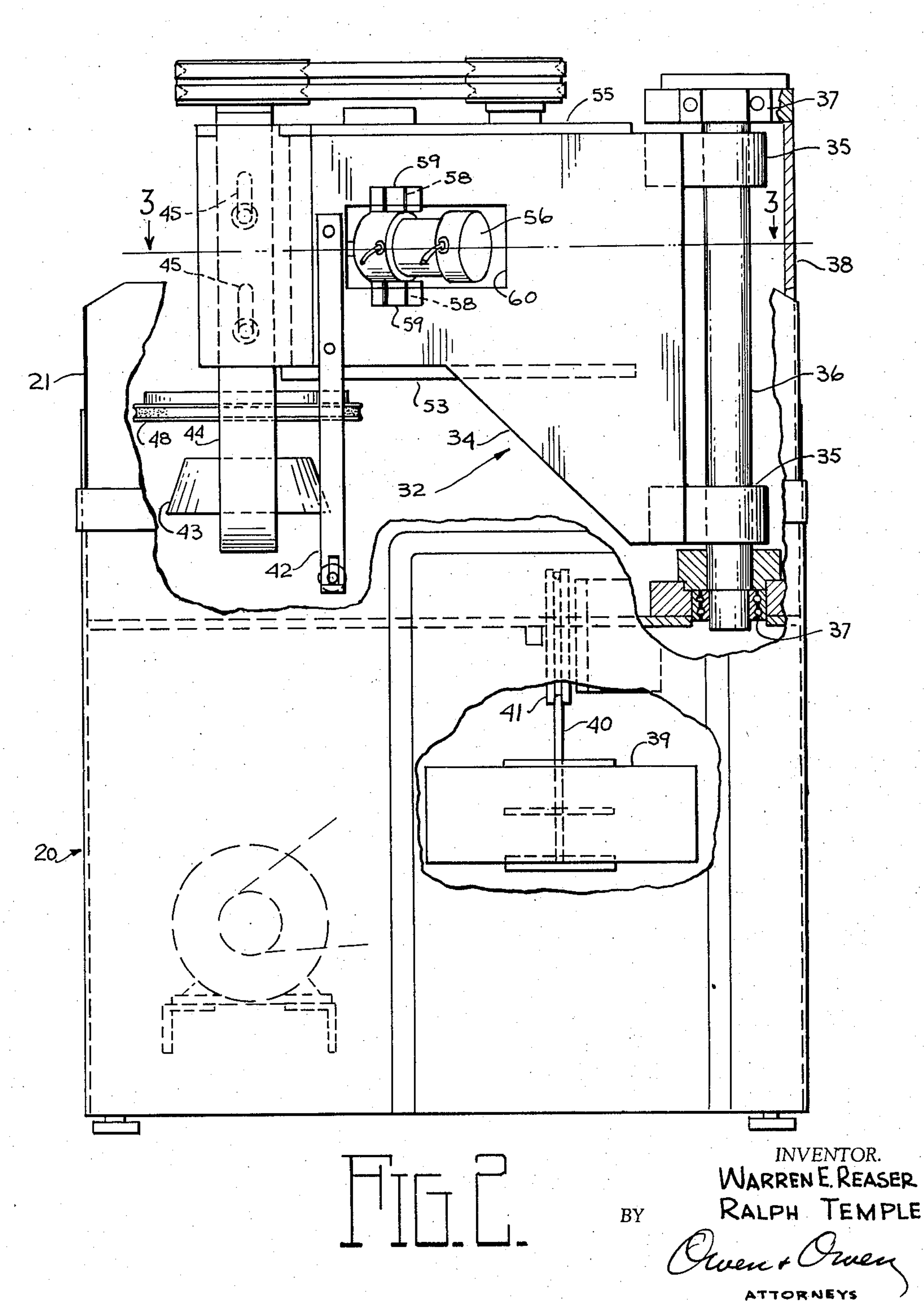
Fig. 2 is an end elevational view, with parts broken away, of the machine illustrated in Fig. 1 and shown on a somewhat enlarged scale.

A machine embodying the invention as illustrated in the drawings comprises, among other parts, a main frame 20 having a splash skirt 21 which extends upwardly and around the front of the grinding area to prevent the splashing of liquid coolant used to cool and lubricate the grinding wheels as they perform their work. The skirt 21 may be lowered to give access to the mechanism. The coolant mechanism is not shown in the drawings since it does not constitute a part of the instant invention and since any conventional coolant pumping and supplying means may be employed.

A machine embodying the invention has a centrally located work table 22 mounted on the upper end of a vertical rotary spindle 23 which also carries a template plate 24 and serves to mount, support and rotate a work piece 25. The work piece is held in position on the table 22 by an upper clamp plate 26 which is mounted upon the lower end of a strut 30 and thrust downwardly by a clamping mechanism carried by an overhead arm 31. The details of the work piece mounting clamp and rotating mechanism do not constitute a part of the instant invention and, therefore, are shown only schematically in the drawings. A complete disclosure of a mechanism which may be employed appears in the above-identified Reaser application.

The work piece clamping and rotating mechanism to be employed in a machine embodying the invention must include a template 24 of a configuration identical with the configuration of the finished work piece, a table 22 and a clamping plate 26, for removably clamping and holding a work piece 25 during grinding. Suitable positioning means for a rough work piece blank must also be employed, such means being shown in detail in the identified Reaser application. The purpose of this mechanism for holding and rotating the work piece and the template 24 is to position the work piece relative to the template 24 and to rotate the two in unison so that the edges of the work piece 25 can be ground to a finished contour controlled and determined by the contour of the template 24.

A machine embodying the invention may have one or more grinding wheel mounting and moving mechanisms and in the machine illustrated in the drawings two of such mechanisms are generally indicated at 32 and 33. The two mechanisms 32 and 33 are identical in construction except for the fact that one is a right hand device and the other a left hand device. In subsequent description of these mechanisms reference will be made throughout to the mechanism identified by the number 32 and shown at the upper part of Figure 1 and in Figures 2, 3, 4 and 5.

The grinding wheel mounting and moving mechanism 32 includes a main wing 34 which is supported by a pair of vertically spaced ears 35 on a pivot rod 36 mounted in turn by upper and lower bearings 37 in a sturdy, rigid, frame upright 38 erected at the rear of the main frame 20. The wing 34 is urged inwardly toward the work piece spindle 23 by a counterweight 39 attached to the end of a counterweight cable 40 which leads over a sheave 41 and is secured to the lower end of an arm 42 bolted to and extending downwardly from the wing 34. A cone-shaped template contactor 43 is mounted on the lower end of an arm 44 dependingly supported at the end of the wing 34 and adjustable vertically relative to the wing 34; there being a pair of vertical slots 45 (Fig. 4) cut in the arm 44 through which clamping bolts 46 extend and are threaded into the main plate of the wing 34. The contactor 43 engages the edge of the template 24. An adjustment screw 47 extends downwardly through a bar 47a at the top of the wing 34 and is threaded into the upper end of the arm 44 for vertical adjustment thereof and of the template contactor 43. Adjustment of the vertical position of the contactor 43 brings different size portions of the contactor 43 in line with the template 24 in order to compensate for wear on the grinding wheel 48.

The grinding wheel 48 may be either a rough grind or finished grind wheel. The wheel 48 illustrated in Figs. 2–5 has a concave periphery and is intended to give the edges of the work pieces a rounded shape. The wheel, however, may have a truly cylindrical periphery or a conical periphery depending upon the finished shape of the edge of the work piece which is desired.

The grinding wheel 48 is removably secured on the lower end of a grinding wheel spindle 49 (Fig. 4) that is journaled in an arbor 50. The arbor 50 is mounted by bolts 51 on a flat face 52 of an angular frame 53.

The frame 53 is carried by the wing 34, being tiltably supported thereon by a vertical swivel pin 54 carried in turn by a pair of horizontally extending spaced arms 55 at the top and bottom of the wing 34. The frame 53 is movable between the two positions illustrated, respectively, in Figs. 3 and 5 by an air cylinder 56 having a piston rod 57 linked to the frame 53. The cylinder 56 is mounted by pins 58 in ears 59 welded or otherwise secured above and below an opening 60 in the wing 34 so that the cylinder 56 may swivel slightly as its piston rod 57 is extended and returned to swing the frame 53 on its swivel pin 54 between the positions of Figs. 3 and 5.

Figure 3:
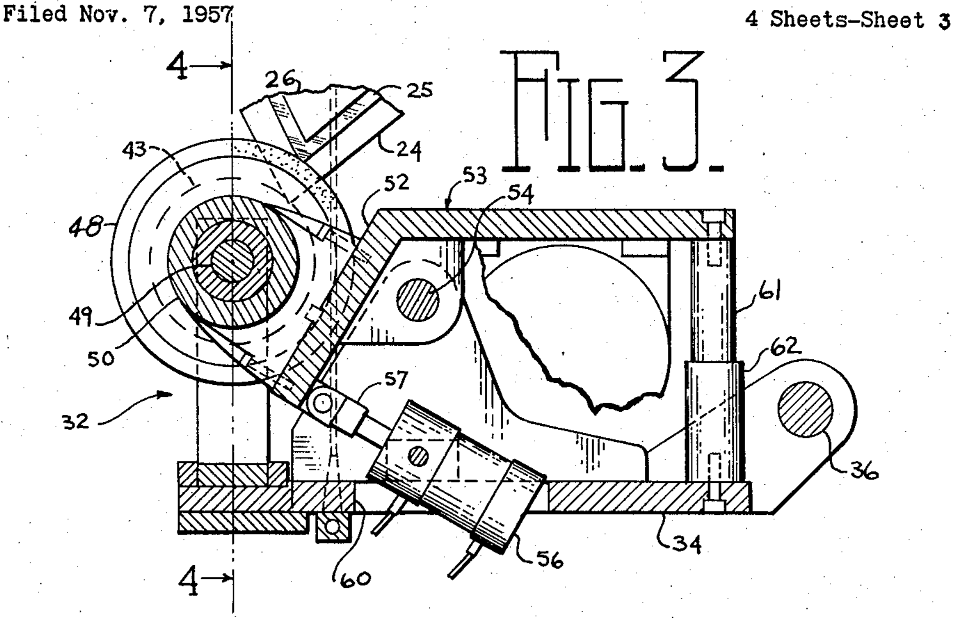
Fig. 3 is a fragmentary, horizontal sectional view taken along the line 3—3 of Fig. 2.
Figure 4:
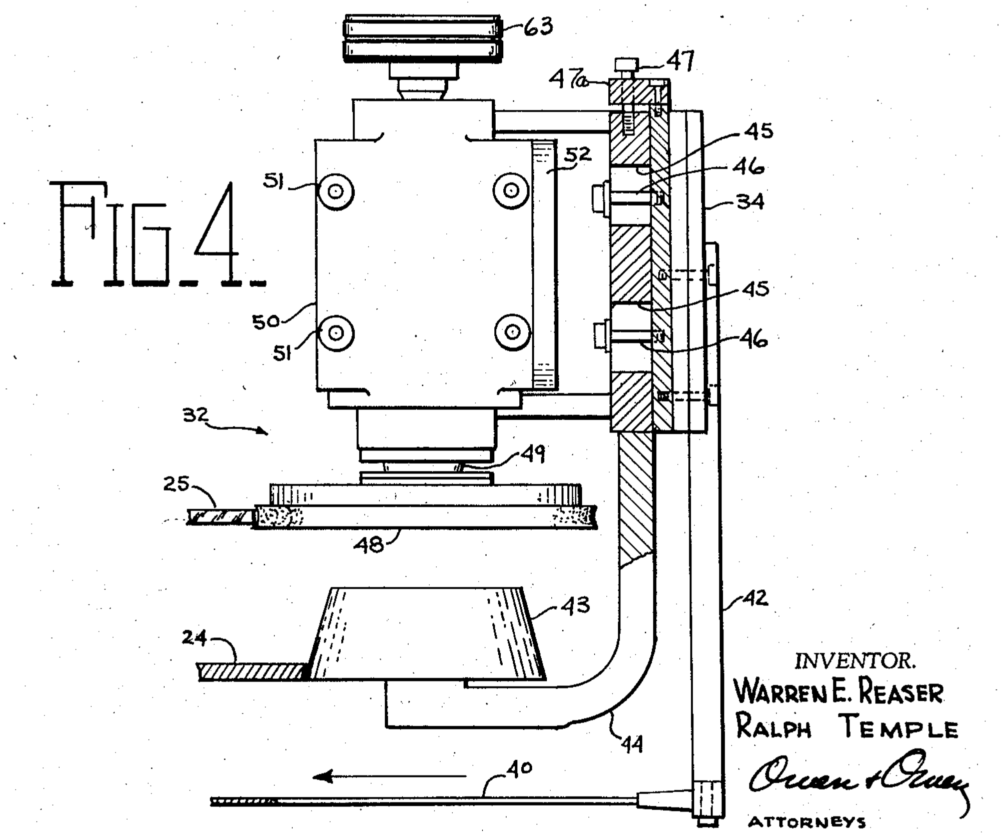
Fig. 4 is a fragmentary, vertical sectional view on an enlarged scale, taken along the line 4—4 of Fig. 3.
Figure 5:
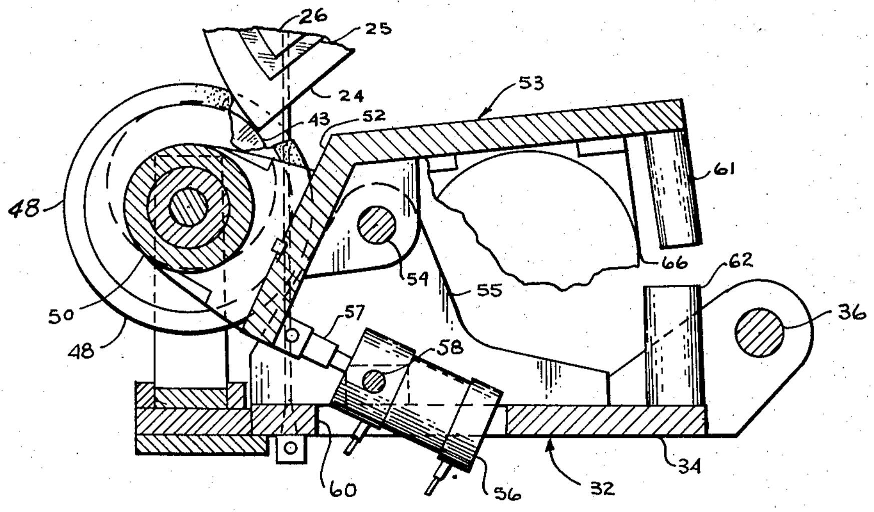
Fig. 5 is a fragmentary, horizontal sectional view similar to Fig. 3 but showing the parts of the machine in a position different from that shown in Fig. 3.

The action of the counterweight 39 urges the entire mechanism 32 inwardly until the template contactor 43 engages the surface of the template 24. At the beginning of a grinding cycle, the air cylinder 56 is energized to pull its piston rod 57 inwardly and thus to swing the frame 53 in a counterclockwise direction to the position shown in Fig. 5. In this position, the grinding wheel 48 is moved backwardly, i.e., away from the position to be occupied by the edge of a work piece. As shown in Fig. 5, the center line of the grinding wheel spindle 49 is spaced away from the center line of the template contactor 43. This gives room for the operator to insert a new work piece into position on the work piece table 22 without engaging the edge of the grinding wheel 48. When the grinding cycle starts, initial activation of the machine energizes solenoid controlled valves to admit air to the cylinder 56 and thrust its piston rod 57 outwardly, thus swinging the frame 53 to the position shown in Fig. 3 with the center line or axis of the grinding wheel 48 coincident with the axis of the template contactor 43, the position also being shown in Fig. 4. Precise positioning of the frame 53 and coincidence of the axes of the grinding wheel 48 and template contactor 43 is determined by a pair of stop posts 61 and 62 one of which is fixedly positioned on the wing 34 and the other on the end of the frame 53 (Figs. 3 and 5). The grinding wheel spindle 49 is rotated by means of belts 63 which are engaged with pulleys 64 on its upper end and with pulleys 65 driven by a motor 66 which is also mounted upon and carried by the frame 53.

By thus mounting only the grinding wheel 48 and motor 66 upon the frame 53, the mass of the mechanism which must be moved to permit the insertion or removal of a raw or finished work piece is substantially reduced, thereby reducing the inertia of the moving mass. By accomplishing the last increment of movement of the grinding wheel under the control of the air cylinder 56 rather than by reason of the counterbalance 39, the speed and distance of movement of the grinding wheel 48 into and out of contact with the work piece are substantially reduced. When a work piece 25 is inserted into the machine so that its edges can be ground, it is larger than the final size to which it will be ground by the machine. If the entire wing 34 with the template contactor 43 is allowed to swing inwardly at the beginning of a cycle, first contact is made by the grinding wheel 48 with the work piece rather than by the template contactor 43 with the template 24. Such a first contact made with the entire mass moving is far more likely to shatter or otherwise seriously damage the work piece than a more gentle, shorter movement, accomplished by the mechanism embodying the invention.

We claim:

1. In an edge grinding machine having a rotatable work piece table adapted to receive and hold a flat work piece with its edges exposed, a template mounted parallel to and co-axially with said work piece and means for rotating said work piece and said template on an axis normal thereto, the improvement consisting of a grinding wheel mounting and moving mechanism consisting of a grinding wheel and a spindle therefor, a sub-frame for rotatably mounting said grinding wheel on an axis parallel to the axis of rotation of said work piece and in line to peripherally contact the edges of said work piece, a swinging frame mounted for angular movement on an axis parallel to the axis of said work piece, a template contactor carried by said swinging frame in line to contact said template, means for urging said contactor against said template, means on said swinging frame for movably mounting said sub-frame thereon and means actuated during a grinding cycles for moving said sub-frame relative to said swinging frame for translating said grinding wheel between a first position in peripheral contact with said work piece and under control of said template contactor and a second position removed from peripheral contact with said work piece.

2. Mechanism according to claim 1 in which said template contactor is circular and is held in tangential contact with said template and in which said grinding wheel is moved by movement of said sub-frame between a first work piece contacting position that is co-axial with said contactor and a second remote position that is parallel to but not co-axial with said template contactor.

3. Mechanism according to claim 1 in which the means for moving said sub-frame relative to said swinging frame is an air cylinder pivotally mounted on said swinging frame and there are co-operating stop means on said sub-frame and said swinging frame for determining said first position.

4. Grinding wheel mounting mechanism for an edge grinding machine having a work piece profile template, a work piece clamping table adapted to hold a flat work piece with its edges exposed and mounted parallel to and co-axially with said template and means for rotating said template and said work piece together around an axis normal to the plane of said work piece, said mechanism comprising a grinding wheel spindle, a frame for mounting said spindle for rotation on an axis parallel to the axis of rotation of said clamping table and with the edge of said grinding wheel aligned with the edge of said work piece, means mounting said frame for translatory movement toward and away from said work piece, a template contactor carried by said frame in alignment with the edge of said template, means for holding said template contactor in contact with said template whereby rotation of said template causes said frame to swing with said grinding wheel following a path determined by contact between said template contactor and said template, a sub-frame pivotally mounted on said frame and supporting said grinding wheel spindle and grinding wheel, and means for moving said sub-frame from a first position with the edge of said grinding wheel positioned against the edge of a work piece under control of said template contactor and a second position with the edge of said grinding wheel spaced away from the edge of a work piece.

References Cited in the file of this patent

UNITED STATES PATENTS

| | | |
|---|---|---|
| 2,579,337 | Reaser et al. | Dec. 18, 1951 |
| 2,597,180 | Reaser et al. | May 20, 1952 |